H. BURDICT & A. GUILD.
Improvement in Snap-Hooks.

No. 132,247. Patented Oct. 15, 1872.

WITNESSES.
Phil. C. Mosi
E. H. Bates

INVENTORS.
Henry Burdict
Augustus Guild
Chipman Hosmer & Co,
Attys.

UNITED STATES PATENT OFFICE.

HENRY BURDICT AND AUGUSTUS GUILD, OF MIDDLETOWN, CONNECTICUT.

IMPROVEMENT IN SNAP-HOOKS.

Specification forming part of Letters Patent No. 132,247, dated October 15, 1872.

*To all whom it may concern:*

Be it known that we, HENRY BURDICT and AUGUSTUS GUILD, of Middletown, in the county of Middlesex and State of Connecticut, have invented a new and valuable Improvement in Self-Mousing and Snap Hooks; and we do hereby declare that the following is a full, clear, and exact description of the construction and operation of the same, reference being had to the annexed drawing making a part of this specification, and to the letters and figures of reference marked thereon.

Figure 1:
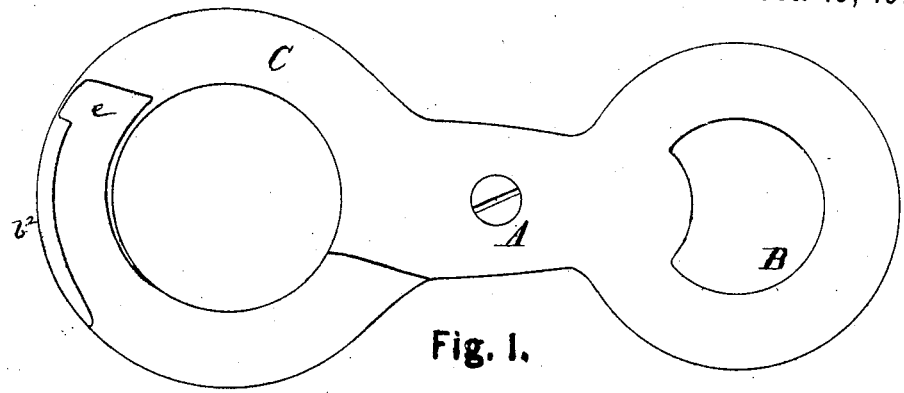
Figure 2:
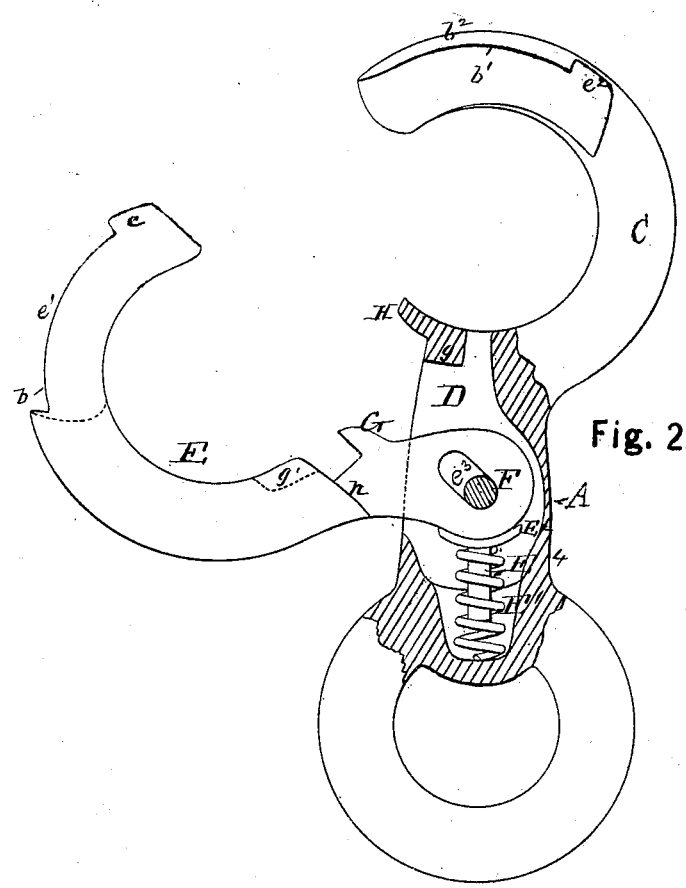

Figure 1 of the drawing is a representation of a top view of my invention; and Fig. 2 is a part-sectional view of my invention.

This invention has relation to self-mousing snap-hooks; and consists in the construction and novel arrangement of the spring-hinge and locking devices, substantially as hereinafter described.

Referring to the drawing, A designates the shank, provided with the ring B and the hook C, and constructed with the irregular recess D to receive the butt of the pivoted hook E, the spring $E^1$, and the post $E^4$. From the middle of the shank to their ends the hooks E C are of about equal length, and being properly recessed at the sides, as hereinafter described, form, when brought together, a ring, as shown in Fig. 1. At $b\ b^1$ corresponding beveled recesses are cut in the hooks C E, so that when said hooks come together an even surface will be obtained for the ring thereby formed. Each recess terminates in a shoulder, against which the ends of the hooks abut. $e$ designates a shoulder at the end of the hook E, produced by cutting a recess, $e^1$, in the outer or convex surface of said hook. This shoulder fits a recess, $e^2$, at the end of the recess $b^1$, above which recess is a flange, $b^2$, which fills the recess $e^1$. Now, when the hooks are fastened together and a rope attached to the ring which they form, they cannot be separated by any direct strain. To uncouple them it is necessary to so manipulate the hook E as to release the shoulder $e$ from the recess of $e^2$. To permit this manipulation the barrel or eye $e^3$ of said hook is slotted, and is hence capable of adjustment upon its pivot F in the direction of the length of said slot. In coupling the hooks the hook E gives sufficiently to let the shoulder $e$ pass the flange $b^1$, after which the coupling is effected through the agency of the spring $E^1$, which encircles the post $E^4$, having the concave head $E^2$, upon which the barrel $e^3$ rests, as shown in Fig. 2. To uncouple the hook, it is necessary to pull the hook E downward in the direction of the pivot before turning it back upon the latter. G designates a beveled lug, which, as the hooks couple, catches behind the shoulder $g$ on the shank A. H is a curved projection upon said shoulder, which at the same time enters a recess, $g'$, in the hook E. At $h$, upon the hook E, are shoulders, which fit close to the sides of the shank A. As the hook E is pressed down to open it the shoulders or projections G $g$ H, which are designed to increase the security of the coupling, become released.

What I claim as my invention, and desire to secure by Letters Patent, is—

1. The self-mousing snap-hook, having the shank A provided with the recess D, post $E^4$, and spring $E^2$, and hook C with recesses $b^1\ e^2$ and flange $b^2$, and the pivoted slotted hook E having corresponding recesses, substantially as specified.

2. The shank A having the shoulder $g$, projection H, and hook C, in combination with the hook E having the beveled projection G and recess $g'$, substantially as specified.

In testimony that we claim the above we have hereunto subscribed our names in the presence of two witnesses.

HENRY BURDICT.
AUGUSTUS GUILD.

Witnesses:
A. PUTNAM,
GEO. S. PARMELEE.